US010369557B2

(12) United States Patent
King et al.

(10) Patent No.: US 10,369,557 B2
(45) Date of Patent: Aug. 6, 2019

(54) THREE-DIMENSIONAL PRINTED OBJECTS FOR CHEMICAL REACTION CONTROL

(71) Applicant: International Business Machines Corporation, Armonk, NY (US)

(72) Inventors: Scott B. King, Rochester, MN (US); Brandon M. Kobilka, Tucson, AZ (US); Joseph Kuczynski, North Port, FL (US); Jason T. Wertz, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 15/485,726

(22) Filed: Apr. 12, 2017

(65) Prior Publication Data
US 2018/0297020 A1    Oct. 18, 2018

(51) Int. Cl.
*G06F 19/00* (2018.01)
*B01J 31/22* (2006.01)
*B33Y 80/00* (2015.01)
*B33Y 70/00* (2015.01)
*B01J 35/02* (2006.01)
*B01J 37/00* (2006.01)
*B29C 64/10* (2017.01)
*B29C 64/106* (2017.01)
(Continued)

(52) U.S. Cl.
CPC .......... *B01J 31/2295* (2013.01); *B01J 35/02* (2013.01); *B01J 37/0009* (2013.01); *B29C 64/10* (2017.08); *B29C 64/106* (2017.08); *B33Y 50/00* (2014.12); *B33Y 70/00* (2014.12); *B33Y 80/00* (2014.12); *B01J 2231/10* (2013.01); *B01J 2231/34* (2013.01); *B01J 2231/4277* (2013.01); *B29C 64/112* (2017.08); *B29C 64/386* (2017.08); *B33Y 10/00* (2014.12)

(58) Field of Classification Search
CPC ............... B01J 2231/10; B01J 2231/34; B01J 2231/4277; B01J 31/2295; B01J 35/02; B01J 37/0009; B29C 64/10; B29C 64/106; B29C 67/0059; B29C 67/0088; B33Y 10/00; B33Y 50/02; B33Y 70/00; B33Y 80/00
See application file for complete search history.

(56) References Cited

U.S. PATENT DOCUMENTS 3,768,955 A    10/1973  McLaughlin
7,087,109 B2 *  8/2006  Bredt .................... C04B 28/14
                                                        106/31.13
(Continued)

FOREIGN PATENT DOCUMENTS

WO    WO 2016/038356 A1    3/2016

OTHER PUBLICATIONS

Jakk, GOPRINT3D, 2016, WWW.goprint3D.co.uk. p. 1-2.*
(Continued)

*Primary Examiner* — Kidest Bahta
(74) *Attorney, Agent, or Firm* — Jared L. Montanaro (57) ABSTRACT

An article of manufacture includes a three-dimensional (3D) printed object for chemical reaction control. The 3D printed object includes a chemical reactant to be released to control a chemical reaction according to a chemical reactant release profile. The chemical reactant release profile is determined based on a shape of the 3D printed object.

7 Claims, 6 Drawing Sheets

(51) Int. Cl.
  *B33Y 50/00* (2015.01)
  *B33Y 10/00* (2015.01)
  *B29C 64/112* (2017.01)
  *B29C 64/386* (2017.01)

(56) References Cited

U.S. PATENT DOCUMENTS

| | | | | |
|---|---|---|---|---|
| 7,261,542 B2* | 8/2007 | Hickerson | | B33Y 10/00 264/308 |
| 8,017,055 B2* | 9/2011 | Davidson | | B29C 41/12 264/308 |
| 9,156,205 B2* | 10/2015 | Mark | | B29C 70/20 |
| 2003/0099708 A1* | 5/2003 | Rowe | | A61J 3/10 424/469 |
| 2006/0208388 A1* | 9/2006 | Bredt | | B33Y 70/00 264/123 |
| 2012/0177696 A1 | 7/2012 | Wang et al. | | |
| 2016/0067177 A1 | 3/2016 | Adams et al. | | |
| 2016/0354315 A1 | 12/2016 | Li | | |

OTHER PUBLICATIONS

U.S. Appl. No. 15/809,371, to Scott B. King et al., entitled, *Three-Dimensional Printed Objects for Chemical Reaction Control*, assigned to International Business Machines Corporation, 31 pages, filed Nov. 10, 2017.

Appendix P; List of IBM Patent or Applications Treated as Related, Nov. 10, 2017, 2 pages.

NUS, *NUS Engineering team develops novel technology to "print" customised tablets for personalised medicine*, NUS News, National University of Singapore online (NU.edu.sg), May 25, 2016, 2 pages, <http://news.nus.edu.sg/press-releases/10439-customised-tablets-personalised-medicine>.

Krassenstein, *Future Buildings to be 3D Printed Out of Rubber Tires, Salt, Paper & More—Ronald Rael's REAL 2015 Presentation*, 3DPrint.com, The Voice of 3D Printing Technologies (online), Jun. 23, 2015, 9 pages, <https://3dprint.com/75047/3d-printed-architecture/>.

\* cited by examiner

THREE-DIMENSIONAL PRINTED OBJECTS FOR CHEMICAL REACTION CONTROL

BACKGROUND

Three-dimensional (3D) printing technology offers exciting possibilities in such varied contexts as rapid prototyping and customized patient-centric drug delivery, among numerous other contexts.

SUMMARY

According to an embodiment, an article of manufacture is disclosed. The article of manufacture includes a three-dimensional (3D) printed object for chemical reaction control. The 3D printed object includes a chemical reactant to be released to control a chemical reaction according to a chemical reactant release profile. The chemical reactant release profile is determined based on a shape of the 3D printed object.

According to another embodiment, a process of forming a 3D printed object for chemical reaction control is disclosed. The process includes determining, for a chemical reaction to be performed according to a specific set of reaction parameters, a chemical reactant release profile for a chemical reactant to be released to control the chemical reaction. The process includes determining a shape of a 3D object to release the chemical reactant according to the chemical reactant release profile. The process also includes generating chemical reactant 3D printing instructions corresponding to the shape of the 3D object. The process further includes utilizing a 3D printer to form a 3D printed object according to the chemical reactant 3D printing instructions. The 3D printed object includes the chemical reactant to be released to control the chemical reaction according to the chemical reactant release profile.

According to yet another embodiment, a computer-implemented method is disclosed. The computer-implemented method includes determining, for a chemical reaction to be performed according to a specific set of reaction parameters, a chemical reactant release profile for a chemical reactant to be released to control the chemical reaction. The computer-implemented method also includes determining a shape of a 3D object to release the chemical reactant according to the chemical reactant release profile. The computer-implemented method further includes generating chemical reactant 3D printing instructions corresponding to the shape of the 3D object. The chemical reactant 3D printing instructions are to be utilized to generate a 3D printed object that includes the chemical reactant to be released to control the chemical reaction according to the chemical reactant release profile.

The foregoing and other objects, features, and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

The present disclosure describes three-dimensional (3D) printed objects for chemical reaction control, processes for generating chemical reactant 3D printing instructions, and processes of utilizing a 3D printer to form 3D printed objects for chemical reaction control according to the chemical reactant 3D printing instructions. The 3D printed objects of the present disclosure are also referred to herein as "reaction vessels" to indicate that the 3D printed objects include chemical reactant(s) to be released to control a chemical reaction according to a specific set of reaction parameters.

In the present disclosure, the specific set of reaction parameters are utilized to generate a chemical reaction release profile, and the chemical reaction release profile is utilized to determine an appropriate shape of an object to be 3D printed into a reaction vessel. The chemical reactant(s) are formed into the appropriate shape using a 3D printer, and the resulting 3D printed reaction vessel may be utilized to control a chemical reaction by releasing the chemical reactant(s) in a manner that is consistent with the specific set of reaction parameters. In some cases, the 3D printed reaction vessels of the present disclosure may enable rapid prototyping of various concentration/time-release profiles for reaction control. Additionally, the 3D printed reaction vessels of the present disclosure may enable one entity to efficiently reproduce a chemical reaction according to reaction parameters specified by another entity. To illustrate, in some cases, the 3D printed reaction vessels may be manufactured according to the specific set of reaction parameters determined by a research institution or other laboratory, and the 3D printed reaction vessels may be provided to another research institution or laboratory. In other cases, the chemical reactant 3D printing instructions to be utilized to form the 3D printed reaction vessel may be provided to the other entity (e.g., as an object file for a particular type of 3D printer, such as a 6-axis 3D printer), and the other entity may utilize the chemical reactant 3D printing instructions to form the 3D printed reaction vessel. Thus, the 3D printed objects for chemical reaction control of the present disclosure may enable improved reproducibility of a particular chemical reaction, such as by an entity with less chemical reaction control expertise.

Figure 1:
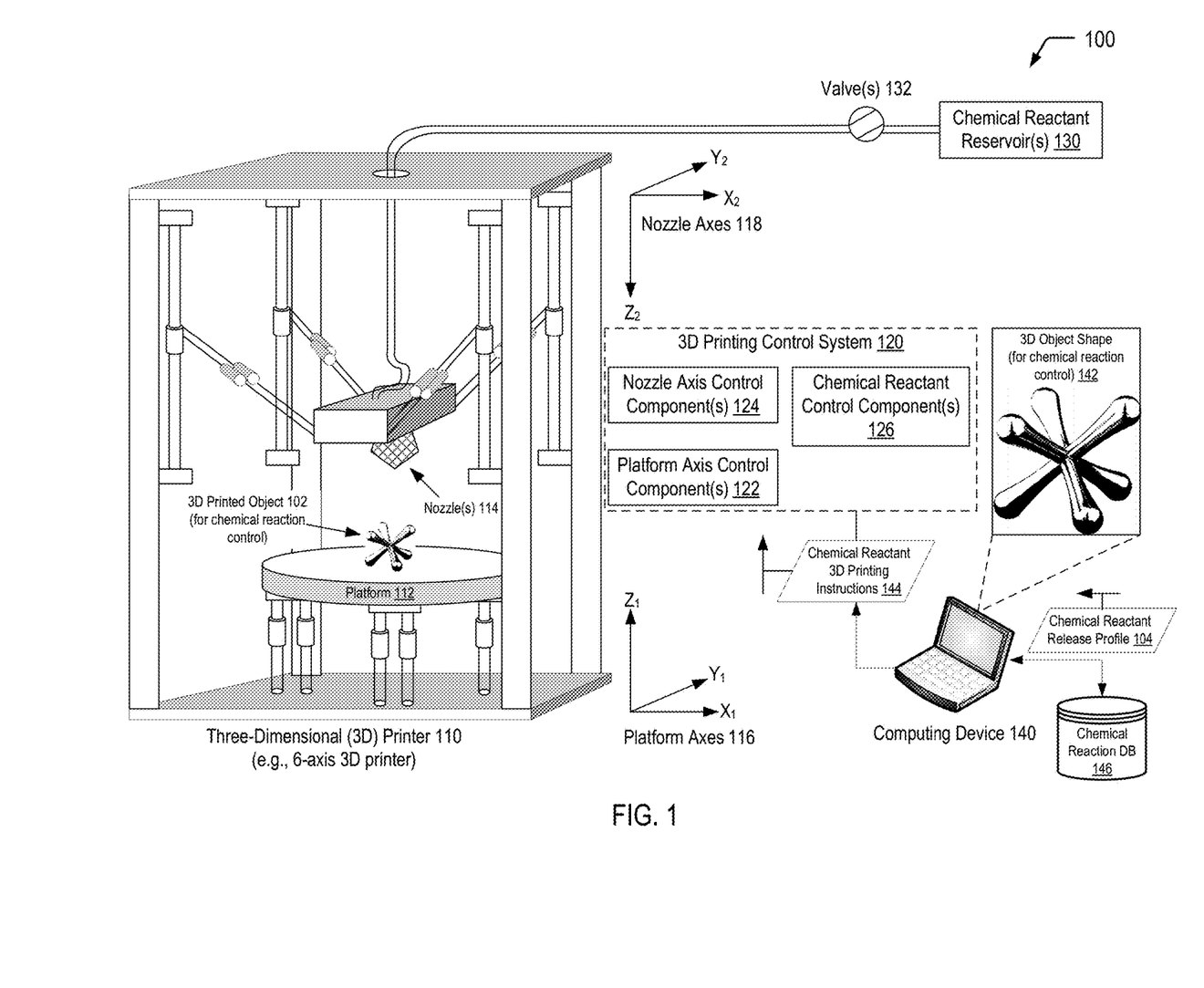
FIG. 1 is a diagram of a system for forming an article of manufacture that includes a 3D printed object for chemical reaction control, according to one embodiment.

Referring to FIG. 1, a diagram illustrates an example of a system 100 for forming an article of manufacture that includes a 3D printed object 102 for chemical reaction control, according to one embodiment. The 3D printed object 102 includes a chemical reactant (or multiple chemical reactants) to be released to control a chemical reaction that is to be performed according to a specific set of reaction parameters. As described further herein, the specific set of reaction parameters may be utilized to determine an appropriate shape of the 3D printed object 102 such that the 3D printed object 102 releases the chemical reactant(s) according to a chemical reaction release profile 104 in order to reproduce the chemical reaction according to the specific set of reaction parameters. FIG. 1 depicts an illustrative, non-limiting example in which the shape of the 3D printed object 102 is similar to a toy jack that has multiple arms (e.g., six arms in the example of FIG. 1). It will be appreciated that the 3D printed object 102 may have an alternative geometric shape (or an alternative thickness or arm count in the case of the toy jack shape) such that the 3D printed object 102 releases the chemical reactant(s) according to a chemical reaction release profile that corresponds to the specific set of reaction conditions. For example, as illustrated and further described herein with respect to FIGS. 2 and 3, arm thickness and/or arm count values may be adjusted to increase/decrease the availability of a chemical reactant over time. Further, while not shown in the example of FIG. 1, in some cases, the 3D printed object 102 (or a portion of the 3D printed object 102, such as a subset of the arms) may be surrounded by an encapsulating material in order to introduce a time delay prior to release of the chemical reactant(s) according to the chemical reactant release profile, as illustrated and further described herein with respect to FIG. 4.

In the particular embodiment depicted in FIG. 1, the system 100 includes a 3D printer 110 that includes a platform 112 and a nozzle 114 (or multiple nozzles) that may be independently rotatable about multiple axes. In the particular embodiment depicted in FIG. 1, the 3D printer 110 is a 6-axis 3D printer that is capable of controlling movement of the platform 112 along three platform axes 116 (identified as axis $X_1$, axis $Y_1$, and axis $Z_1$ in FIG. 1) and movement of the nozzle 114 along three nozzle axes 118 (identified as axis $X_2$, axis $Y_2$, and axis $Z_2$ in FIG. 1). In other embodiments, alternative types of 3D printers may be utilized depending on a complexity of a shape of a particular 3D printed object that is satisfactory to reproduce a particular set of chemical reaction parameters.

The 3D printer 110 is configured to form the 3D printed object 102 for chemical reaction control. In the embodiment depicted in FIG. 1, the 3D printer 110 includes a 3D printing control system 120 that may include multiple 3D printing control components. In the example of FIG. 1, the 3D printing control system 120 includes a platform axis control component 122 (or multiple components), a nozzle axis control component 124 (or multiple components), and a chemical reactant control component 126 (or multiple components). The system 100 includes a chemical reactant reservoir 130 (or multiple reservoirs) to store a chemical reactant (or multiple chemical reactants) to be delivered to the nozzle(s) 114 during 3D printing operations responsive to control signals received from the chemical reactant control component(s) 126.

In the example of FIG. 1, the system 100 further includes a computing device 140 that may be configured to determine a shape 142 of a 3D object that is satisfactory to release the chemical reactant according to the chemical reactant release profile 104. The chemical reactant release profile 104 may be determined based on data for a particular chemical reaction that is stored at a chemical reaction database 146, as described further herein. The computing device 140 may be further configured to generate chemical reactant 3D printing instructions 144 corresponding to the shape 142 of the 3D object. The platform axis control component(s) 122 may be configured to control movement of the platform 112 along the three platform axes 116 according to the chemical reactant 3D printing instructions 144 received from the computing device 140. The nozzle axis control component(s) 124 may be configured to control movement of the nozzle(s) 114 along the three nozzle axes 118 according to the chemical reactant 3D printing instructions 144 received from the computing device 140. The chemical reactant control component(s) 126 may be configured to control release of chemical reactant(s) from the chemical reactant reservoir(s) 130 (e.g., using one or more valves 132 in fluid communication with the nozzle(s) 114) according to the chemical reactant 3D printing instructions 144 received from the computing device 140.

The computing device 140 may be configured to determine the shape 142 of the 3D object for a particular set of reaction parameters corresponding to the chemical reactant release profile 104. In the illustrative, non-limiting example of FIG. 1, the shape 142 of the 3D object corresponds to a toy jack shape having six arms. It will be appreciated that numerous other alternative shapes may be utilized, with the particular shape selected such that the chemical reactant is released from the 3D printed object 102 in a manner that corresponds to the particular set of reaction parameters. An example of an alternative shape includes a sphere that includes multiple concentric layers (similar to a "jaw-breaker" shape), with each layer including "patches" of a chemical reactant (or multiple chemical reactants). The thickness of a particular layer controls the release of the particular chemical reactant(s) within the particular layer as the individual layers are exposed over time during a chemical reaction. As illustrated and further described herein with respect to FIGS. 2-4, for the example of the toy jack shape, the computing device 140 may determine a particular combination of arm thickness (see FIG. 2), arm count (see FIG. 3), and optionally encapsulating material thickness (see FIG. 4) that is appropriate for a specific set of reaction parameters.

Illustrative, non-limiting examples of chemical reactions to be evaluated by the computing device 140 to determine the shape 142 of the 3D object include cross-coupling polymerization reactions, living polymerization reactions, substitution nucleophilic ($S_N2$) reactions, or Grignard reactions. Examples of living polymerization reactions include a living anionic polymerization reaction, a living cationic polymerization reaction, a living ring-opening metathesis polymerization reaction, a living free radical polymerization reaction, or a living chain-growth polycondensation reaction.

In some cases, a chemical reaction may utilize a catalyst, and the catalyst may correspond to the chemical reactant to be released to control the chemical reaction according to the chemical reactant release profile 104. In a particular embodiment, the chemical reaction may correspond to a reaction that utilizes a transition metal (e.g., in the form of an organometallic complex) as a catalyst. Some catalytic transition metals may be utilized in a state that is prone to rapid oxidation, such as a Palladium(0) complex or a Nickel(0) complex. During longer reactions involving such transition metal catalysts, there may be a need for monitoring the reaction and adding additional catalyst (as well as the corresponding ligand) in order to ensure that the reaction progresses. In this case, the chemical reactant release profile 104 may identify that an initial concentration of a catalyst is to be added rapidly and that a suitable level of the catalyst is to be maintained via a slow, controlled release of the catalyst. As an illustrative, non-limiting example, the 3D printed object 102 may be suitable for a Yamamoto cross-coupling polymerization reaction, which is used for direct coupling of aryl halides with aryl halides using a bis (cyclooctadiene)nickel(0) compound. Such a polymerization reaction may be performed in a mixture of dimethylformamide (DMF) and toluene, and the bis(cyclooctadiene)nickel(0) compound may be included in the 3D printed object 102 and may be encapsulated using a variety of different polymeric materials, such as polystyrene, poly(methylmethacrylate), poly(vinylacetate), among others.

As another example, the chemical reactant release profile 104 may include information for a chemical reaction in which a slow release of catalyst may be utilized to control molecular weight of polymerization, such as control of chain growth or step growth. As another example, the chemical reactant release profile 104 may include information for a multiple-stage reaction and/or a consecutive reaction. To illustrate, a multiple-stage reaction may include a timed release of a single reactant as a reaction progresses, introduction of other reactant(s) as the reaction progresses, or a combination thereof. To illustrate, for an $S_N2$ reaction, the chemical reactant release profile 104 may identify that a base is to be released first, creating a nucleophile in the reaction, followed by an electrophile. As a further example, the chemical reactant release profile 104 may include information associated with release of a fouling component. As yet another example, the chemical reactant release profile 140 may include information associated with release of chemical(s) into a living polymerization reaction, such as a living anionic polymerization, a living cationic polymerization, a living ring-opening metathesis polymerization, a living free radical polymerization, or a living chain-growth polycondensation reaction.

As yet another example, the chemical reactant release profile 104 may include information that corresponds to a particular set of chemical reaction parameters associated with a Grignard reaction. In this case, the chemical reactant release profile 104 may correspond to slow formation of a Grignard reagent, where bound magnesium is introduced at a rate that is satisfactory to prevent a run-away reaction. To illustrate, in a Grignard reaction, an alkyl halide or an aryl halide (e.g., hexyl bromide, phenyl bromide, etc.) is added to a suspension of magnesium in diethyl ether or tetrahydrofuran (THF). The halide reacts directly with the surface of the magnesium, but the reaction does not happen immediately in most cases. However, once the halide reacts, the reaction is exothermic, and the heat that is added to the reaction mixture accelerates the reaction. As it typically takes time for the reagents to react, the halide concentration can increase rapidly if the reaction is not carefully monitored, potentially resulting in a run-away reaction with a positive feedback loop of more heat increasing the rate of reaction. Accordingly, the halide may be incorporated into the 3D printed object 102 (e.g., within an inert material, such as an ether or a THF-soluble polymer such as polystyrene) at a varied concentration that would result in a slow, controlled release of the halide. In some cases, magnesium may also be incorporated into the 3D printed object 102.

Thus, FIG. 1 illustrates an example of a system for forming an article of manufacture that includes a 3D printed object for chemical reaction control. The 3D printed object includes a chemical reactant (or multiple chemical reactants) to be released to control a chemical reaction that is to be performed according to a specific set of reaction parameters. In some cases, the 3D printed object may enable rapid prototyping of various concentration/time-release profiles for reaction control. Additionally, the 3D printed object may enable one entity to efficiently reproduce a chemical reaction according to reaction parameters specified by another entity.

In other cases, the chemical reactant 3D printing instructions to be utilized to form the 3D printed object may be provided to the other entity, and the other entity may utilize the chemical reactant 3D printing instructions to form the 3D printed object. Thus, the 3D printed object may enable improved reproducibility of a particular chemical reaction, such as by an entity with less chemical reaction control expertise.

Figure 2:
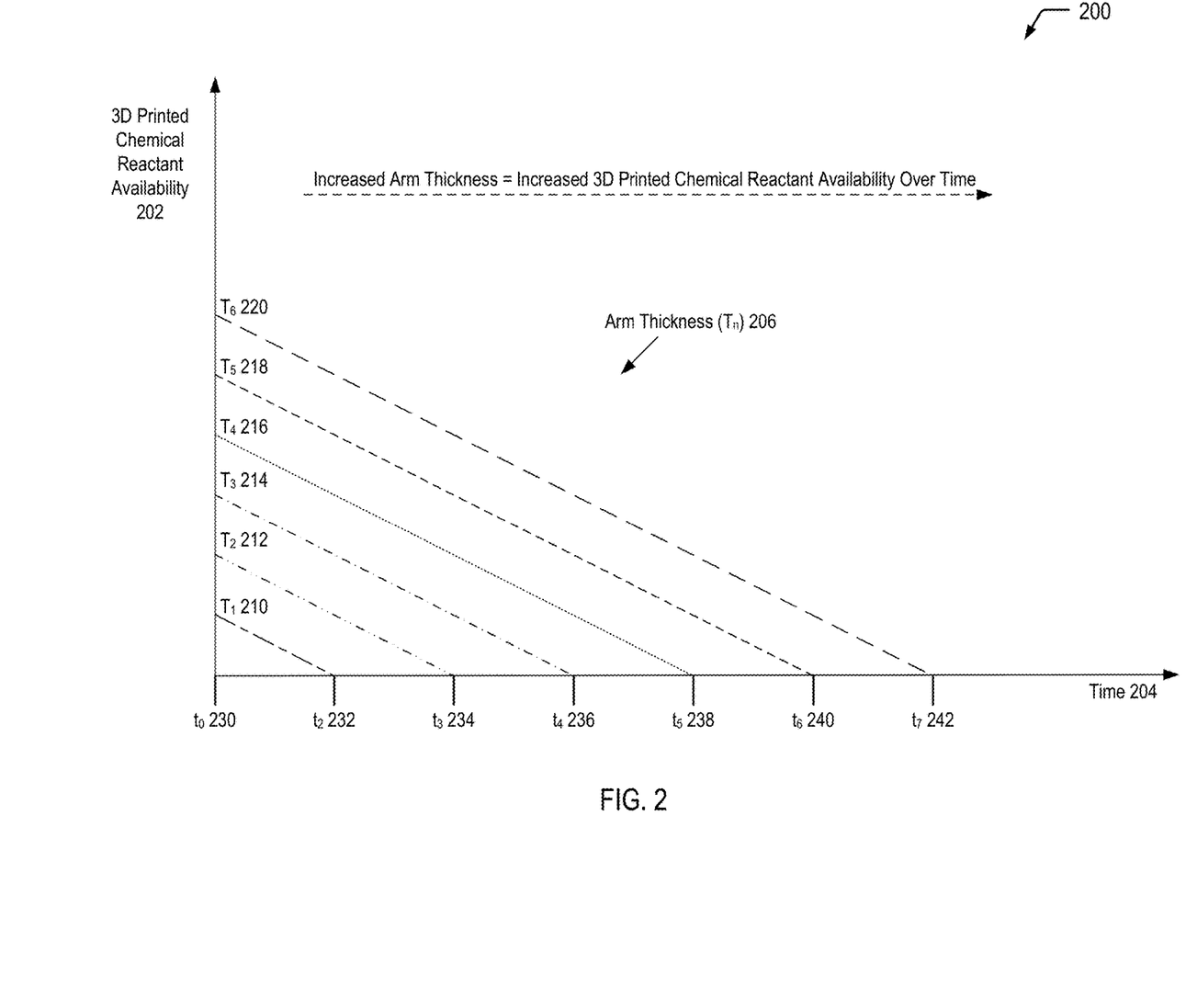
FIG. 2 is a diagram illustrating an example of the effect of arm thickness of a 3D printed object that includes one or more arms on the availability of a 3D printed chemical reactant over time.
Figure 3:
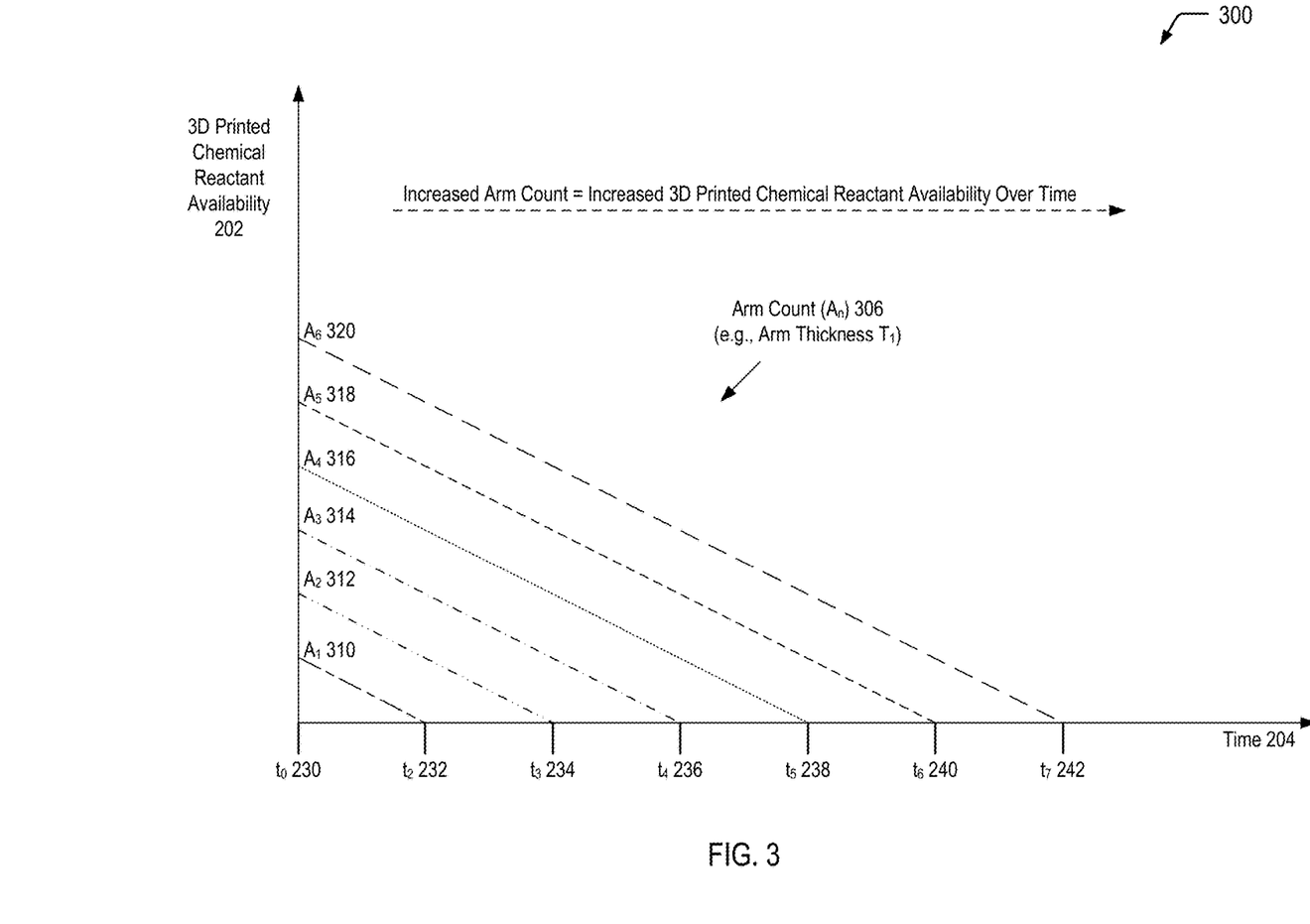
FIG. 3 is a diagram illustrating an example of the effect of a number of arms of a 3D printed object that includes one or more arms on the availability of a 3D printed chemical reactant over time.
Figure 4:
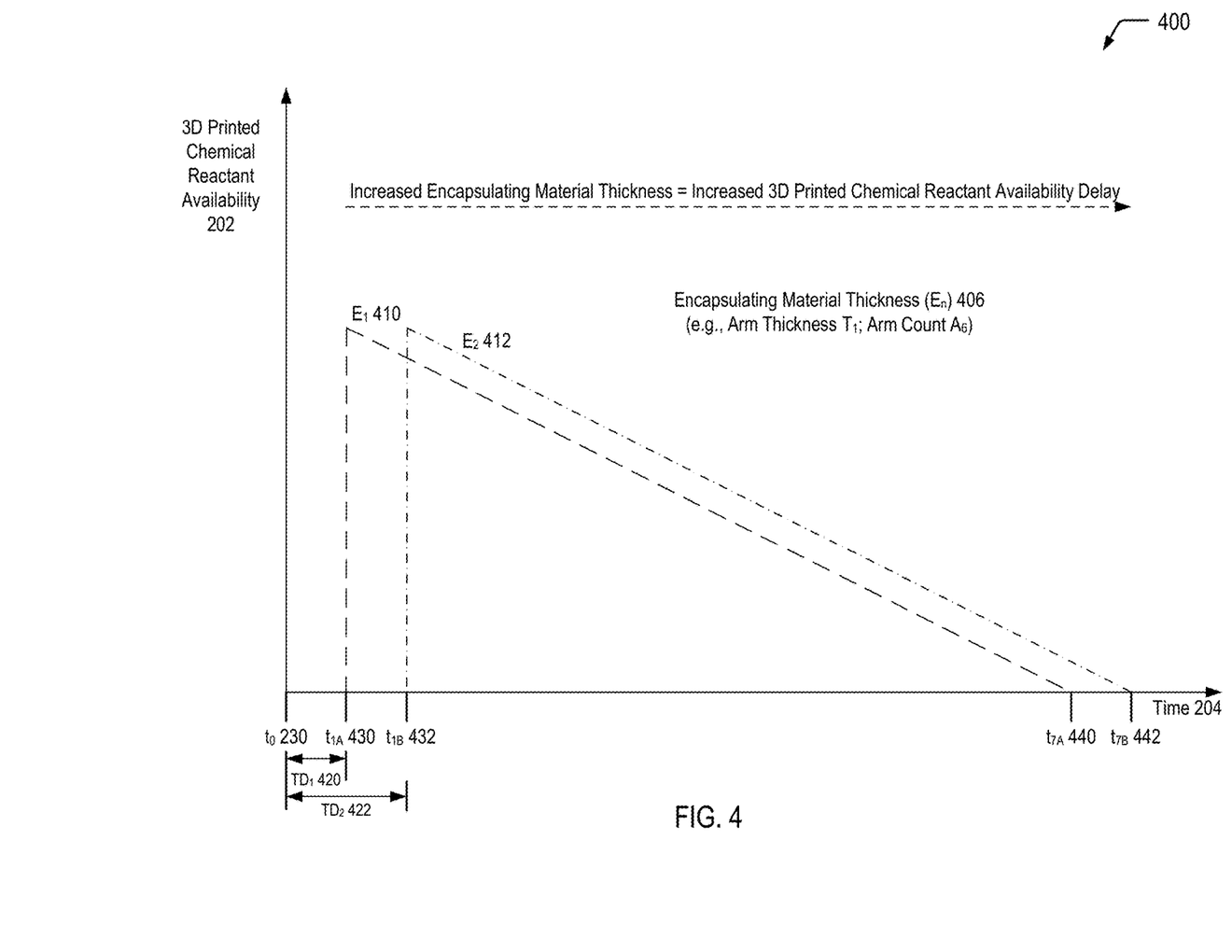
FIG. 4 is a diagram illustrating an example of the effect of a thickness of an encapsulating material surrounding a 3D printed object on the delayed availability of a 3D printed chemical reactant.

FIGS. 2-4 illustrate examples of factors that may be utilized by the computing device 140 of FIG. 1 to determine the shape 142 of the 3D object such that the chemical reactant is released from the 3D printed object 102 for chemical reaction control according to a specific set of reaction parameters defined by the chemical reactant release profile 104.

Referring to FIG. 2, a diagram 200 illustrates an example of the effect of arm thickness of a 3D printed object that includes one or more arms on the availability of a 3D printed chemical reactant over time. While FIG. 2 is designed to illustrate the dependence of the availability of the 3D printed chemical reactant on arm thickness for the toy jack shape with multiple arms depicted in FIG. 1, it will be appreciated that thickness of a particular feature of an alternatively shaped 3D printed object also affects the availability of the 3D printed chemical reactant over time. Further, FIG. 2 depicts the reduced availability of the 3D printed chemical reactant over time as linear decay for illustrative purposes only.

FIG. 2 is a graph that illustrates a relationship between 3D printed chemical reactant availability 202 over time 204 for multiple arm thickness values ($T_n$) 206. In the example of FIG. 2, six arm thickness values are depicted, with the arm thickness values increasing along the Y-axis, with a first arm thickness value ($T_1$) 210 representing the smallest arm thickness value depicted in FIG. 2. In order of increasing arm thickness, the other arm thickness values include a second arm thickness value ($T_2$) 212, a third arm thickness value ($T_3$) 214, a fourth arm thickness value ($T_4$) 216, a fifth arm thickness value ($T_5$) 218, and a sixth arm thickness value ($T_6$) 220. In order to simplify the explanation of the type of analysis performed by the computing device 140 of FIG. 1 with respect to identification of the shape 142 of the 3D object, the first arm thickness value 210 of FIG. 2 corresponds to a nominal thickness value, and the other arm thickness values 212-220 correspond to integer multiples of the first arm thickness value 210. That is, the second arm thickness value 212 corresponds to 2× the first arm thickness value 210; the third arm thickness value 212 corresponds to 3× the first arm thickness value 210; the fourth arm thickness value 214 corresponds to 4× the first arm thickness value 210; the fifth arm thickness value 218 corresponds to 5× the first arm thickness value 210; and the sixth arm thickness value 220 corresponds to 6× the first arm thickness value 210.

FIG. 2 illustrates that the 3D printed chemical reactant availability 202 corresponding to the first arm thickness value 210 decreases over a first period of time defined by an initial time ($t_0$) 230 and a second time ($t_2$) 232. FIG. 2 further illustrates that the 3D printed chemical reactant availability 202 corresponding to the second arm thickness value 212 decreases over a second period of time defined by the initial time ($t_0$) 230 and a third time ($t_3$) 234; the third arm thickness value 214 decreases over a third period of time defined by the initial time ($t_0$) 230 and a fourth time ($t_4$) 236; the fourth arm thickness value 216 decreases over a fourth period of time defined by the initial time ($t_0$) 230 and a fifth time ($t_5$) 238; the fifth arm thickness value 218 decreases over a fifth period of time defined by the initial time ($t_0$) 230 and a sixth time ($t_6$) 240; and the sixth arm thickness value 220 decreases over a sixth period of time defined by the initial time ($t_0$) 230 and a seventh time ($t_7$) 242. In order to simplify the explanation of the type of analysis performed by the computing device 140 of FIG. 1 with respect to identification of the shape 142 of the 3D object, FIG. 2 illustrates that the first period of time defined by the initial time ($t_0$) 230 and the second time ($t_2$) 232 corresponds to a nominal time value, and the other periods of time correspond to integer multiples of the first period of time.

The initial time ($t_0$) 230 corresponds to a time of arm exposure to a chemical reaction. In the example of FIG. 2, the initial time ($t_0$) 230 corresponds to time zero. As illustrated and further described herein with respect to FIG. 4, in cases where an encapsulating material surrounds an arm of the 3D printed object 102 of FIG. 1, there may be a time delay between a time that the arm of the encapsulated 3D printed object is introduced and a time that the arm is exposed to the chemical reaction. As such, while FIG. 2 illustrates an example in which the initial time ($t_0$) 230 is consistent with immediate exposure of the arm upon introduction of the 3D printed object into a chemical reaction, it will be appreciated that the initial time ($t_0$) 230 may be determined based on the time delay that is proportional to a thickness of the encapsulating material.

Thus, FIG. 2 illustrates that one factor to be utilized by the computing device 140 of FIG. 1 to determine the shape 142 of an arm of the 3D object is a desired period of time for the chemical reactant to be released, as defined by the chemical reactant release profile 104. As illustrated in the example of FIG. 2, the thickness of the arm may be selected such that the chemical reactant is released from the 3D printed object 102 over the desired period of time.

Referring to FIG. 3, a diagram 300 illustrates an example of the effect of an arm count of a 3D printed object that includes one or more arms on the availability of a 3D printed chemical reactant over time. While FIG. 3 is designed to illustrate the dependence of the availability of the 3D printed chemical reactant on arm count for the toy jack shape with multiple arms depicted in FIG. 1, it will be appreciated that a number of particular features of an alternatively shaped 3D printed chemical reactant also affects the availability of the 3D printed chemical reactant. Further, FIG. 3 depicts the reduced availability of the 3D printed chemical reactant over time as linear decay for illustrative purposes only.

FIG. 3 is a graph that illustrates a relationship between the 3D printed chemical reactant availability 202 over time 204 for multiple arm counts ($A_n$) 306 of a particular arm thickness. For ease of illustration purposes, FIG. 3 illustrates an example in which the particular arm thickness value corresponds to the first arm thickness value $T_1$ 210 depicted in FIG. 2. In the example of FIG. 3, six arm count values are depicted, with the number of arms increasing along the Y-axis, with a first arm count ($A_1$) 310 representing a single arm. In order of increasing number of arms, the other arm count values correspond to two arms ($A_2$) 312, three arms ($A_3$) 314, four arms ($A_4$) 316, five arms ($A_5$) 318, and six arms ($A_6$) 320.

FIG. 3 illustrates that the 3D printed chemical reactant availability 302 corresponding to the first arm count value 310 decreases over a first period of time defined by the initial time ($t_0$) 230 and the second time ($t_2$) 232. FIG. 3 further illustrates that the 3D printed chemical reactant availability 202 corresponding to the second arm count value 312 decreases over a second period of time defined by the initial time ($t_0$) 230 and the third time ($t_3$) 234; the third arm count value 314 decreases over a third period of time defined by the initial time ($t_0$) 230 and the fourth time ($t_4$) 236; the fourth arm count value 316 decreases over a fourth period of time defined by the initial time ($t_0$) 230 and the fifth time ($t_5$) 238; the fifth arm count value 318 decreases over a fifth period of time defined by the initial time ($t_0$) 230 and the sixth time ($t_6$) 240; and the sixth arm count value 320 decreases over a sixth period of time defined by the initial time ($t_0$) 230 and the seventh time ($t_7$) 242. In order to simplify the explanation of the type of analysis performed by the computing device 140 of FIG. 1 with respect to identification of the shape 142 of the 3D object, FIG. 3 illustrates that the first period of time defined by the initial time ($t_0$) 330 and the second time ($t_2$) 332 corresponds to a nominal time value, and the other periods of time correspond to integer multiples of the first period of time.

The initial time ($t_0$) 230 corresponds to a time of arm exposure to a chemical reaction. In the example of FIG. 3, the initial time ($t_0$) 230 corresponds to time zero. As illustrated and further described herein with respect to FIG. 4, in cases where an encapsulating material surrounds an arm of the 3D printed object 102 of FIG. 1, there may be a time delay between a time that the arm of the encapsulated 3D printed object is introduced and a time that the arm is exposed to the chemical reaction. As such, while FIG. 3 illustrates an example in which the initial time ($t_0$) 230 is consistent with immediate exposure of the arm upon introduction of the 3D printed object into a chemical reaction, it will be appreciated that the initial time ($t_0$) 230 may be determined based on the time delay that is proportional to a thickness of the encapsulating material.

Thus, FIG. 3 illustrates that one factor to be utilized by the computing device 140 of FIG. 1 to determine the shape 142 of an arm of the 3D object is a desired period of time for the chemical reactant to be released, as defined by the chemical reactant release profile 104. As illustrated in the example of FIG. 3, the number of arms may be selected such that the chemical reactant is released from the 3D printed object 102 over the desired period of time.

Referring to FIG. 4, a diagram 400 illustrates an example of the effect of a thickness of an encapsulating material surrounding a 3D printed object on the delayed availability of a 3D printed chemical reactant. While FIG. 4 is designed to illustrate the dependence of the delayed availability of the 3D printed chemical reactant on a thickness of an encapsulating material surrounding the toy jack shape with multiple arms depicted in FIG. 1, it will be appreciated that a thickness of an encapsulating material surrounding an alternatively shaped 3D printed object also affects the delayed availability of the 3D printed chemical reactant. Further, FIG. 4 depicts the reduced availability of the 3D printed chemical reactant over time as linear decay for illustrative purposes only.

FIG. 4 is a graph that illustrates a relationship between the 3D printed chemical reactant availability 202 over time 204 for multiple encapsulating material thickness values ($E_n$) 406. For ease of illustration purposes, FIG. 4 illustrates an example in which the particular arm thickness value corresponds to the first arm thickness value $T_1$ 210 depicted in FIG. 2 and the arm count corresponds to the sixth arm count $A_6$ 320 depicted in FIG. 3. In the example of FIG. 4, two encapsulating material thickness values are depicted, with a first encapsulating material thickness value ($E_1$) 410 representing a thickness value that is less than a second encapsulating material thickness value ($E_2$) 412.

FIG. 4 illustrates that, by encapsulating a 3D printed object having the first thickness value 210 of FIG. 2 and the sixth arm count $T_6$ 320 of FIG. 3 (i.e., six arms) that is comparable to the shape 142 depicted in FIG. 1 to be used to form the 3D printed object 102, a time of initial exposure of the arms of the 3D printed object 102 may be delayed for a period of time that is determined based on a thickness of the encapsulating material. To illustrate, for the first encapsulating material thickness value $E_1$ 410, the time of initial release of the chemical reactant may be shifted from the initial time $(t_0)$ 230 depicted in FIGS. 2 and 3 in order to introduce a first time delay $(TD_1)$ 420. For the second encapsulating material thickness value $(E_2)$ 412, the time of initial release of the chemical reactant may be shifted from the initial time $(t_0)$ 230 depicted in FIGS. 2 and 3 in order to introduce a second time delay $(TD_2)$ 422. In order to simplify the explanation of the type of analysis performed by the computing device 140 of FIG. 1 with respect to identification of the shape 142 of the 3D object, the first encapsulating material thickness value $(E_1)$ 410 of FIG. 4 corresponds to a nominal encapsulating material thickness value, and the second encapsulating material thickness value $(E_2)$ 412 of FIG. 4 correspond to a 2× multiple of the first encapsulating material thickness value $(E_1)$ 410.

The introduction of the first time delay $(TD_1)$ 420 results in the time of initial release of the chemical reactant being shifted from the second time $(t_2)$ 232 depicted in FIGS. 2 and 3 to a first delayed time $(t_{1A})$ 430. Further, the introduction of the first time delay $(TD_1)$ 420 results in a shift of the seventh time $(t_7)$ 242 of FIGS. 2 and 3 to a first delayed end time $(t_{7A})$ 440. The introduction of the second time delay $(TD_2)$ 422 results in the time of initial release of the chemical reactant being shifted from the second time $(t_2)$ 232 depicted in FIGS. 2 and 3 to a second delayed time $(t_{1B})$ 432. Further, the introduction of the second time delay $(TD_2)$ 422 results in a shift of the seventh time $(t_7)$ 242 of FIGS. 2 and 3 to a second delayed end time $(t_{7A})$ 442.

Thus, FIG. 4 illustrates that an encapsulating material surrounding a 3D printed object may be utilized in order to delay the availability of a 3D printed chemical reactant. FIG. 4 illustrates that the delayed availability of the 3D printed chemical reactant is dependent on a thickness of an encapsulating material. Thus, in some chemical reactions in which a delayed availability of a particular chemical reactant is appropriate, the computing device 140 of FIG. 1 may determine an encapsulating thickness value (for a particular arm thickness/arm count) that is satisfactory to reproduce the desired time delay of chemical reactant release from the 3D printed object 102.

Figure 5:
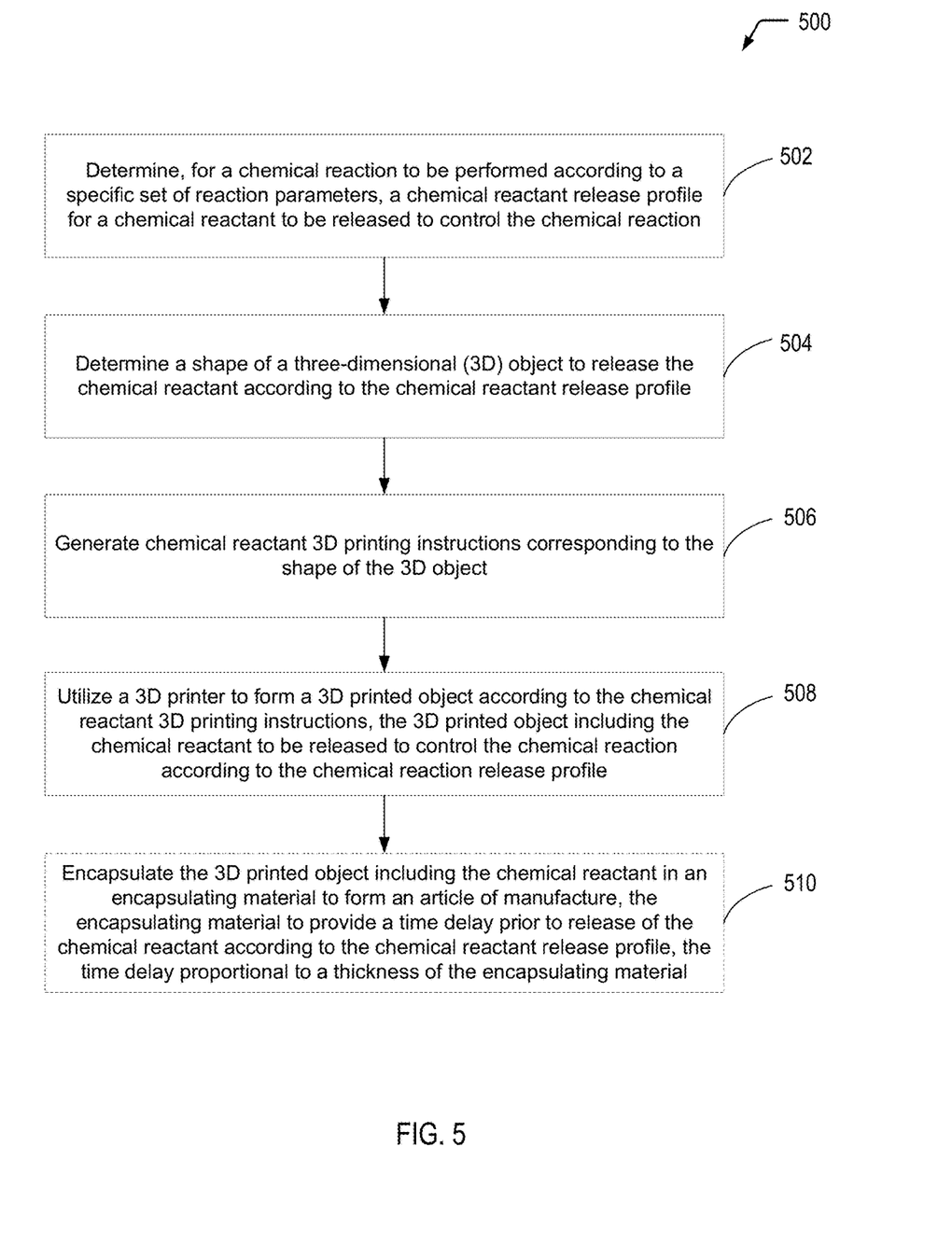
FIG. 5 is a flow diagram depicting a particular embodiment of a process of forming a 3D printed object for chemical reaction control.

Referring to FIG. 5, a flow diagram illustrates a particular embodiment of a process 500 of forming a 3D printed object for chemical reaction control. In the particular embodiment depicted in FIG. 5, the process 500 further includes forming an article of manufacture by encapsulating the 3D printed object in an encapsulating material.

The process 500 includes determining a chemical reactant release profile for a chemical reactant to be released to control a chemical reaction, at 502. The chemical reaction is to be performed according to a specific set of reaction parameters. For example, referring to FIG. 1, the computing device 104 may determine the chemical reactant release profile 104 for a particular chemical reaction based on information stored at the chemical reaction database 146. As previously described herein, the chemical reaction database 146 may store information associated with multiple types of chemical reactions. As illustrative, non-limiting examples, the chemical reaction may include a cross-coupling polymerization reaction, a substitution nucleophilic ($S_N2$) reaction, a Grignard reaction, a living anionic polymerization reaction, a living cationic polymerization reaction, a living ring-opening metathesis polymerization reaction, a living free radical polymerization reaction, or a living chain-growth polycondensation reaction.

The process 500 includes determining a shape of a 3D object to release the chemical reactant according to the chemical reactant release profile, at 504. For example, referring to FIG. 1, the computing device 140 may determine the shape 142 of the 3D object to release the chemical reactant according to the chemical reactant release profile 104. In the particular embodiment depicted in FIG. 1, the shape 142 of the 3D object is similar to a toy jack that includes multiple arms (e.g., 6 arms in the example of FIG. 1). As described further herein with respect to FIG. 2, different arm thickness values may be associated with different 3D printed chemical reactant availability profiles. Additionally, as described further herein with respect to FIG. 3, different numbers of arms may be associated with different 3D printed chemical reactant availability profiles. In addition, as further described herein with respect to FIG. 4, in cases where the 3D printed object 102 is to be surrounded by an encapsulating material, different time delay values may be associated with different encapsulating material thickness values. Accordingly, as described further herein with respect to FIGS. 1-4, the computing device 140 may utilize multiple factors to determine the shape 142 of the 3D object that is appropriate for the chemical reactant release profile 104 in order to achieve a desired 3D printed chemical reactant availability over time that matches the specific set of reaction parameters associated with a particular chemical reaction.

The process 500 includes generating chemical reactant 3D printing instructions corresponding to the shape of the 3D object, at 506. For example, referring to FIG. 1, the computing device 140 may generate the chemical reactant 3D printing instructions 144 corresponding to the shape 142 of the 3D object. In a particular embodiment, the chemical reactant 3D printing instructions 144 may be in an object (.obj) file format that is appropriate for the particular 3D printer 110 to be utilized to form the 3D printed object 102. In the example of FIG. 1, the 3D printer 110 corresponds to a 6-axis 3D printer. In this case, the chemical reactant 3D printing instructions 144 may include information to be utilized by the 3D printing control system 120 to control movement of the platform 112 about the three platform axes 116 and to control movement of the nozzle(s) 114 about the three nozzle axes 118 in order to dispense chemical reactant(s) at appropriate locations. Each chemical reaction dispensation location corresponds to a particular combination of a platform axis location defined by an $X_1$, $Y_1$, and $Z_1$ value and a nozzle axis location value defined by an $X_2$, $Y_2$, and $Z_2$ value.

The process 500 includes utilizing a 3D printer to form a 3D printed object according to the chemical reactant 3D printing instructions, at 508. The 3D printed object includes the chemical reactant to be released to control the chemical reaction according to the chemical reactant release profile. For example, referring to FIG. 1, the 3D printer 110 may be utilized to form the 3D printed object 102 according to the chemical reactant 3D printing instructions 144 received from the computing device 140. The 3D printed object 102 includes the chemical reactant (or multiple chemical reactants) dispensed from the chemical reactant reservoir(s) 130 via the nozzle(s) 114. The chemical reactant is to be released from the 3D printed object 102 to control a particular chemical reaction (having a specific set of reaction parameters stored at the chemical reaction database 146) according to the chemical reactant release profile 104.

In the particular embodiment depicted in FIG. 5, the process 500 also includes encapsulating the 3D printed object (including the chemical reactant) in an encapsulating material to form an article of manufacture, at 510. The encapsulating material provides a time delay prior to release of the chemical reactant according to the chemical reactant release profile, where the time delay is proportional to a thickness of the encapsulating material. For example, while not shown in the example of FIG. 1, the 3D printer 110 may be utilized to encapsulate the 3D printed object 102 in an encapsulating material. As described further herein, in some cases, the encapsulating material may have a shape that is substantially similar to the shape of the 3D printed object 102 (e.g., an encapsulating layer disposed on a surface of a toy jack shape with six arms, in the example of FIG. 1). In other cases, the encapsulating material may have a second shape that is different from the shape of the 3D printed object 102 (e.g., a spherical shape, a cubic shape, etc.) that is selected to effect a particular time delay that is appropriate for release of the chemical reactant based on the chemical reactant release profile 104. As previously described herein with respect to FIG. 4, increasing the encapsulating material thickness may result in an increase in the 3D printed chemical reactant availability delay.

Thus, FIG. 5 illustrates an example of a process of forming a 3D printed object for chemical reaction control. In some cases, the 3D printed object for chemical reaction control may enable rapid prototyping of various concentration/time-release profiles for reaction control. Further, the 3D printed object for chemical reaction control may enable improved reproducibility of a particular chemical reaction. To illustrate, the 3D printed object for chemical reaction control may enable one entity to efficiently reproduce a chemical reaction according to reaction parameters specified by another entity.

Figure 6:
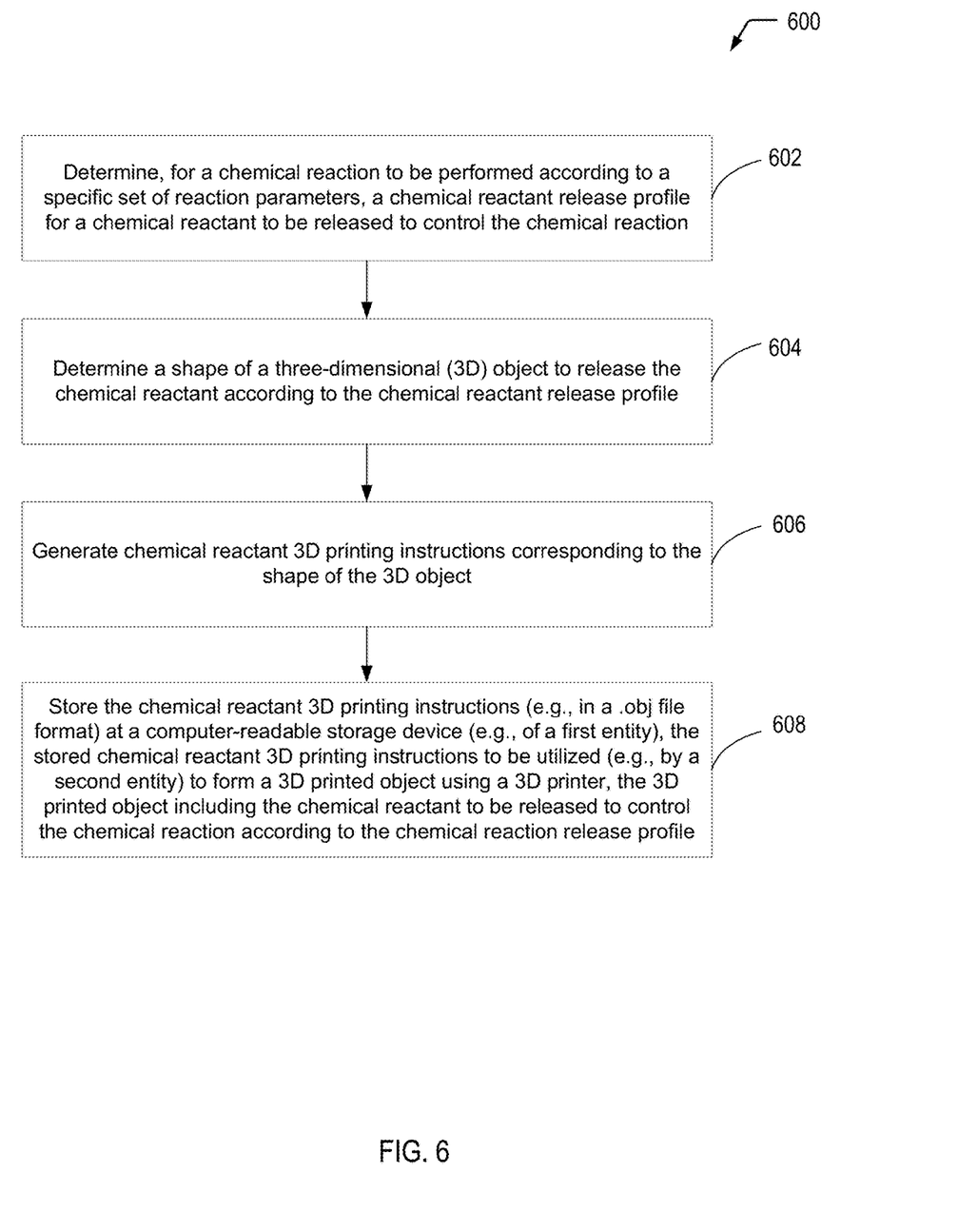
FIG. 6 is a flow diagram depicting a particular embodiment of a computer-implemented method of generating chemical reactant 3D printing instructions to be utilized to form a 3D printed object for chemical reaction control.

Referring to FIG. 6, a flow diagram illustrates a particular embodiment of a computer-implemented method 600 of generating chemical reactant 3D printing instructions to be utilized to form a 3D printed object for chemical reaction control.

The computer-implemented method 600 includes determining a chemical reactant release profile for a chemical reactant to be released to control a chemical reaction, at 602. The chemical reaction is to be performed according to a specific set of reaction parameters. For example, referring to FIG. 1, the computing device 104 may determine the chemical reactant release profile 104 for a particular chemical reaction based on information stored at the chemical reaction database 146. As previously described herein, the chemical reaction database 146 may store information associated with multiple types of chemical reactions. As illustrative, non-limiting examples, the chemical reaction may include a cross-coupling polymerization reaction, a substitution nucleophilic ($S_N2$) reaction, a Grignard reaction, a living anionic polymerization reaction, a living cationic polymerization reaction, a living ring-opening metathesis polymerization reaction, a living free radical polymerization reaction, or a living chain-growth polycondensation reaction.

The computer-implemented method 600 includes determining a shape of a 3D object to release the chemical reactant according to the chemical reactant release profile, at 604. For example, referring to FIG. 1, the computing device 140 may determine the shape 142 of the 3D object to release the chemical reactant according to the chemical reactant release profile 104. In the particular embodiment depicted in FIG. 1, the shape 142 of the 3D object is similar to a toy jack that includes multiple arms (e.g., 6 arms in the example of FIG. 1). As described further herein with respect to FIG. 2, different arm thickness values may correspond to different 3D printed chemical reactant availability over time. Additionally, as described further herein with respect to FIG. 3, different numbers of arms may correspond to different 3D printed chemical reactant availability over time. In addition, as further described herein with respect to FIG. 4, in cases where the 3D printed object 102 is to be surrounded by an encapsulating material, different time delay values may be associated with different encapsulating material thickness values. Accordingly, as described further herein with respect to FIGS. 1-4, the computing device 140 may utilize multiple factors to determine the shape 142 of the 3D object that is appropriate for the chemical reactant release profile 104 in order to achieve a desired 3D printed chemical reactant availability over time that matches the specific set of reaction parameters associated with a particular chemical reaction.

The computer-implemented method 600 includes generating chemical reactant 3D printing instructions corresponding to the shape of the 3D object, at 606. For example, referring to FIG. 1, the computing device 140 may generate the chemical reactant 3D printing instructions 144 corresponding to the shape 142 of the 3D object.

In the particular embodiment depicted in FIG. 6, the computer-implemented method 600 also includes storing the chemical reactant 3D printing instructions at a computer-readable storage device, at 608. The stored chemical reactant 3D printing instructions are to be utilized to form a 3D printed object using a 3D printer. The 3D printed object includes the chemical reactant to be released to control the chemical reaction according to the chemical reaction release profile. For example, referring to FIG. 1, the computing device 140 may be associated with a first entity, such as a chemist that has developed a particular set of chemical reaction parameters for a chemical reaction. In some cases, it may be desirable for the chemical reaction to be reproducible by a second entity. In this case, after generating the chemical reactant 3D printing instructions 144, the computing device 140 may store the chemical reactant 3D printing instructions 144 at a computer-readable storage device (not shown in FIG. 1). The stored chemical reactant 3D printing instructions 144 may be sent to the second entity from the first entity or otherwise made accessible to the second entity (e.g., via a network). In some cases, the stored chemical reactant 3D printing instructions 144 may represent an open-source 3D printing instruction file that may enable efficient validation/reproduction of the chemical reaction by the second entity. In other cases, the stored chemical reactant 3D printing instructions 144 may be proprietary to the first entity.

In a particular embodiment, the computing device 140 (e.g., of a first entity) may store the chemical reactant 3D printing instructions 144 in an object (.obj) file format that is appropriate for the particular 3D printer 110 to be utilized to form the 3D printed object 102. In the example of FIG. 1, the 3D printer 110 corresponds to a 6-axis 3D printer that may be associated with a second entity (in some cases). In this case, the stored chemical reactant 3D printing instructions 144 may include information to be utilized by the 3D printing control system 120 to control movement of the platform 112 about the three platform axes 116 and to control movement of the nozzle(s) 114 about the three nozzle axes 118 in order to dispense chemical reactant(s) at appropriate locations. Each chemical reaction dispensation location corresponds to a particular combination of a platform axis location defined by an $X_1$, $Y_1$, and $Z_1$ value and a nozzle axis location value defined by an $X_2$, $Y_2$, and $Z_2$ value.

Thus, FIG. 6 illustrates an example of a process of a computer-implemented method of generating chemical reactant 3D printing instructions to be utilized to form a 3D printed object for chemical reaction control. In some cases, the 3D printing instructions may enable one entity to manufacture a 3D printed object for chemical reaction control in order to efficiently reproduce a chemical reaction according to reaction parameters specified by another entity.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A process of forming a three-dimensional (3D) printed object for chemical reaction control, the process comprising:
   determining, by a processor, for a chemical reaction to be performed according to a specific set of reaction parameters, a chemical reactant release profile for one or more chemical reactants to be released to control the chemical reaction, wherein the chemical reactant release profile indicates a concentration level of each of the one or more chemical reactants;
   determining a shape of a three-dimensional (3D) object to release the one or more chemical reactants according to the chemical reactant release profile, wherein the shape of the 3D object includes one or more arms, each of the one or more arms being at least one of the one or more chemical reactants;
   generating chemical reactant 3D printing instructions corresponding to the shape of the 3D object; and
   utilizing a 3D printer to form a 3D printed object according to the chemical reactant 3D printing instructions, the 3D printed object including the one or more chemical reactants to be released to control the chemical reaction according to the chemical reactant release profile.

2. The process of claim 1, wherein the chemical reaction includes a cross-coupling polymerization reaction, a substitution nucleophilic (SN2) reaction, a Grignard reaction, a living anionic polymerization reaction, a living cationic polymerization reaction, a living ring-opening metathesis polymerization reaction, a living free radical polymerization reaction, or a living chain-growth polycondensation reaction.

3. The process of claim 1, further comprising utilizing the 3D printer to encapsulate the 3D printed object in an encapsulating material.

4. A computer-implemented method comprising:
   determining, by a processor, for a chemical reaction to be performed according to a specific set of reaction parameters, a chemical reactant release profile for one or more chemical reactants to be released to control the chemical reaction, wherein the chemical reactant release profile indicates a concentration level of each of the one or more chemical reactants;
   determining a shape of a three-dimensional (3D) object to release the one or more chemical reactants according to the chemical reactant release profile, wherein the shape of the 3D object includes one or more arms, each of the one or more arms being at least one of the one or more chemical reactants;
   generating chemical reactant 3D printing instructions corresponding to the shape of the 3D object, the chemical reactant 3D printing instructions to be utilized to form a 3D printed object that includes the one or more chemical reactants to be released to control the chemical reaction according to the chemical reactant release profile; and
   utilizing a 3D printer to form the 3D printed object according to the chemical reactant 3D printing instructions, wherein the 3D printer includes a 6-axis 3D printer.

5. The computer-implemented method of claim 4, further comprising storing the chemical reactant 3D printing instructions at a computer-readable storage device of a first entity, the stored chemical reactant 3D printing instructions to be utilized by a second entity to form the 3D printed object using a 3D printer.

6. The computer-implemented method of claim 5, wherein the first entity performs the chemical reaction according to the specific set of reaction parameters, and wherein the stored chemical reactant 3D printing instructions are utilized by the second entity to reproduce the chemical reaction according to the specific set of reaction parameters.

7. The computer-implemented method of claim 5, wherein the chemical reactant 3D printing instructions are stored at the computer-readable storage device in an object (.obj) file format.

* * * * *